US008702165B2

(12) United States Patent
Oota

(10) Patent No.: US 8,702,165 B2
(45) Date of Patent: Apr. 22, 2014

(54) VEHICLE SEAT

(75) Inventor: Hiroki Oota, Inazawa (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 501 days.

(21) Appl. No.: 12/951,215

(22) Filed: Nov. 22, 2010

(65) Prior Publication Data

US 2011/0133525 A1 Jun. 9, 2011

(30) Foreign Application Priority Data

Dec. 8, 2009 (JP) ................................ 2009-278348

(51) Int. Cl.
*A47C 7/62* (2006.01)

(52) U.S. Cl.
USPC ............... 297/180.14; 297/180.13; 297/180.1

(58) Field of Classification Search
USPC ............................ 297/180.14, 180.13, 180.1
See application file for complete search history.

(56) References Cited

U.S. PATENT DOCUMENTS

| | | | | |
|---|---|---|---|---|
| 6,196,627 | B1 * | 3/2001 | Faust et al. | 297/180.14 |
| 6,682,140 | B2 * | 1/2004 | Minuth et al. | 297/180.14 |
| 6,685,553 | B2 * | 2/2004 | Aoki | 454/120 |
| 6,736,452 | B2 * | 5/2004 | Aoki et al. | 297/180.13 |
| 6,848,742 | B1 * | 2/2005 | Aoki et al. | 297/180.14 |
| 7,070,232 | B2 * | 7/2006 | Minegishi et al. | 297/180.14 |
| 7,213,876 | B2 * | 5/2007 | Stoewe | 297/180.14 |
| 7,475,938 | B2 * | 1/2009 | Stoewe et al. | 297/180.14 |
| 7,506,924 | B2 * | 3/2009 | Bargheer et al. | 297/180.14 |
| 7,673,935 | B2 * | 3/2010 | Nishide et al. | 297/180.14 |
| 7,857,395 | B2 * | 12/2010 | Kikuchi et al. | 297/452.47 |
| 2005/0200166 | A1 * | 9/2005 | Noh | 297/180.14 |
| 2007/0107440 | A1 | 5/2007 | Ito et al. | |
| 2009/0079236 | A1 | 3/2009 | Itou et al. | |
| 2009/0322124 | A1 * | 12/2009 | Barkow et al. | 297/180.14 |
| 2010/0038937 | A1 * | 2/2010 | Andersson et al. | 297/180.14 |

FOREIGN PATENT DOCUMENTS

| | | |
|---|---|---|
| JP | 2-33663 | 3/1990 |
| JP | 2003-285628 | 10/2003 |
| JP | 2004-8334 | 1/2004 |
| JP | 2007-137185 | 6/2007 |

OTHER PUBLICATIONS

U.S. Appl. No. 13/017,251 to Hiroki Oota et al., which was filed on Jan. 31, 2011.

Japanese Office Action dated Oct. 8, 2013, along with an English-language translation thereof.

* cited by examiner

*Primary Examiner* — Laurie Cranmer
(74) *Attorney, Agent, or Firm* — Greenblum & Bernstein, P.L.C.

(57) ABSTRACT

A vehicle seat includes a seat cushion, and a seat back including a blower. The seat back includes an interior pad facing an outer circumference of the seat back other than a part of the seat back at a rear side, and a fabric seat cover covering the interior pad to configure an exterior covering. The seat cover includes a seated occupant's side surface portion and a rear surface portion joined together to form a bag-like configuration. The interior pad is formed with an air guiding path which guides air from the blower to a surface of the seat back at a seated occupant's side. A part of the rear surface portion which does not cover the interior pad is formed as a permeation block portion having permeability lower than that of the seated occupant's side surface portion so as to block the permeation of air from the outside.

6 Claims, 4 Drawing Sheets

30 60 63 (31) 33 30c 52 50 54 65b 41 (40) 42 43 65 48 66 45 65a 62 30b 56 47 (40) 49 32 (31) 23 25 44 51 61 57 30a 57 57 55 OUTSIDE AIR 30d S 21 (20) 69 UPPER OCCUPANT'S SIDE REAR LOWER

VEHICLE SEAT

BACKGROUND OF THE INVENTION

1. Field of the Invention

The present invention relates to a vehicle seat which is provided in a motor vehicle, and more particularly, to a vehicle seat which includes a blower for blowing out air toward a seated occupant from an interior of a seat back of the seat.

2. Description of the Related Art

A vehicle such as a motor vehicle is provided with a vehicle seat for an occupant to be seated thereon. The vehicle seat includes a seat cushion, on which the occupant is seated and a seat back, against which the back of the occupant rests when seating on the seat cushion. In a vehicle seat, there is known a vehicle seat which includes a seat back in which air is blown from an interior of the seat back toward a seated occupant on the seat (for example, refer to JP-A-2004-8334). This type of vehicle seat includes a blower in the interior of the seat back and is generally called as an air-conditioned seat.

Generally, a seat cover is provided also on the air-conditioned seat as an exterior cover which covers an interior pad. As this type of seat cover, there is known a seat cover which is different from a seat cover described in JP-A-2004-8334. That is, the seat cover described in JP-A-2004-8334 is divided into a seated occupant's side part (a front side part) and a rear side part. In contrast, there is known a seat cover including a seated occupant's side surface portion and a rear surface portion which are joined into a bag-like configuration. The seat cover having this bag-like configuration allows the placing work to be simpler since the seat cover can be simply placed on the seat back to cover it. Additionally, this seat cover can reduce the number of components, thereby making it possible to produce the seat cover with lower cost and to reduce size for providing the seat cover.

In the meantime, the seat cover like that described above is generally formed of fabric from the viewpoint of touch feeling. Therefore, the seat cover has permeability which allows air to flow between the interior and the outside of the seat back.

In the vehicle seat, which is called as the air-conditioned seat, however, air is sent from the interior of the seat back toward the occupant seated on the vehicle seat outside the seat back by the blower included therein. Therefore, the blower provided in the interior of the seat back suctions air outside the seat back into the interior of the seat back. In this course, outside air that is suctioned into the interior of the seat back passes through the fabric seat cover, so that the seat cover functions as an air filter and gets dirty. If the seat cover gets dirty in that way, the outer appearance of the seat cover is deteriorated, which is unpleasant and unacceptable.

SUMMARY OF THE INVENTION

The present invention has been made in view of the above circumstances, and an object of the present invention is to maintain an excellent outer appearance of a vehicle seat including a blower in a seat back, which blows out air from an interior of the seat back toward a seated occupant, by suppressing a fabric seat cover from getting dirty.

According to an illustrative embodiment of the present invention, there is provided a vehicle seat including: a seat cushion, on which an occupant is seated; and a seat back which configures a backrest, against which a back of the occupant rests, and which includes a blower provided therein and configured to blow outside air toward the occupant seated on the seat cushion. The seat back includes: an interior pad which is provided so as to face an outer circumference of the seat back other than a part of the seat back at a rear side opposite to a seated occupant's side; and a fabric seat cover which has permeability and covers the interior pad to configure an exterior covering. The seat cover includes: a seated occupant's side surface portion which lies on the seated occupant's side of the seat back when the seat cover is placed on; and a rear surface portion which lies on the rear side of the seat back when the seat cover is placed on, the seated occupant's side surface portion and the rear surface portion being joined together to form a bag-like configuration. The interior pad is formed with an air guiding path which is configured to guide air sent from the blower to a surface of the seat back at the seated occupant's side. At least a part of the rear surface portion of the seat cover, which does not cover the interior pad, is formed as a permeation block portion having permeability lower than that of the seated occupant's side surface portion of the seat cover so as to block the permeation of air into an interior of the seat back from the outside of the seat back.

According to this configuration, air sent from the blower is guided to the surface of the seat back at the seated occupant's side through the air guiding path formed in the interior pad. The air is sent from the interior of the seat back to the outside the seat back due to the permeability of the fabric seat cover. Accordingly, air is blown out to the seated occupant, so that the seated occupant can feel coolness.

In addition, at least a part of the rear surface portion of the seat cover having the bag-like configuration, which does not cover the interior pad is formed as the permeation block portion which blocks the permeation of air into the interior of the seat back from the outside of the seat back. Thus, the permeation of air from the outside of the seat back is blocked by the interior pad having the low permeability and the permeation block portion of the seat cover. Therefore, in taking in outside air to the interior of the seat back where the blower is provided, outside air is not taken in through the seat cover, so that the seat cover can be prevented from functioning as an air filter. Consequently, the fabric seat cover is prevented from getting dirty, and the good external appearance of the vehicle seat can be maintained without being deteriorated.

In the above configuration, the interior pad may be provided to extend continuously over the seated occupant's side of the seat back, an upper side of the seat back and left and right lateral side of the seat back, and the permeation block portion may extend so as to partially overlap an end portion of a part of the interior pad at the rear side of the seat back.

According to this configuration, the permeation interrupted portion of the seat cover is formed so as to extend to partially overlap the end portion of a part of the interior pad which lies on the rear side of the seat back. Thus, air cannot be taken in from a boundary portion between the interior pad and the permeation block portion of the seat cover to the interior of the seat back. Accordingly, the possibility of the boundary portion between the interior pad and the permeation block portion of the seat cover getting dirty can be reduced, and the good external appearance of the vehicle seat can be maintained without being deteriorated.

According to another illustrative embodiment of the present invention, there is provided a vehicle seat including: a seat cushion; a seat back which includes a fabric seat cover having a front portion and a rear portion, an interior pad which supports the front portion of the seat cover and parts of the rear portion of the seat cover at right and left sides of the seat back, to configure an outer shape of the seat back, and which includes a first air guiding path; a blower which is provided in the seat back between the interior pad and the rear portion of the seat cover and which is configured to blow air toward the front portion of the seat cover through the first air guiding path; an air intake part which is formed between the front portion and the rear portion of the seat cover at a lower end thereof; and a second air guiding path which is defined between the interior pad and the rear portion of the seat cover, and which is configured to guide air from the air intake part to the blower.

DETAILED DESCRIPTION

Hereinafter, illustrative embodiments of the present invention will be described by reference to the drawings.

Figure 1:
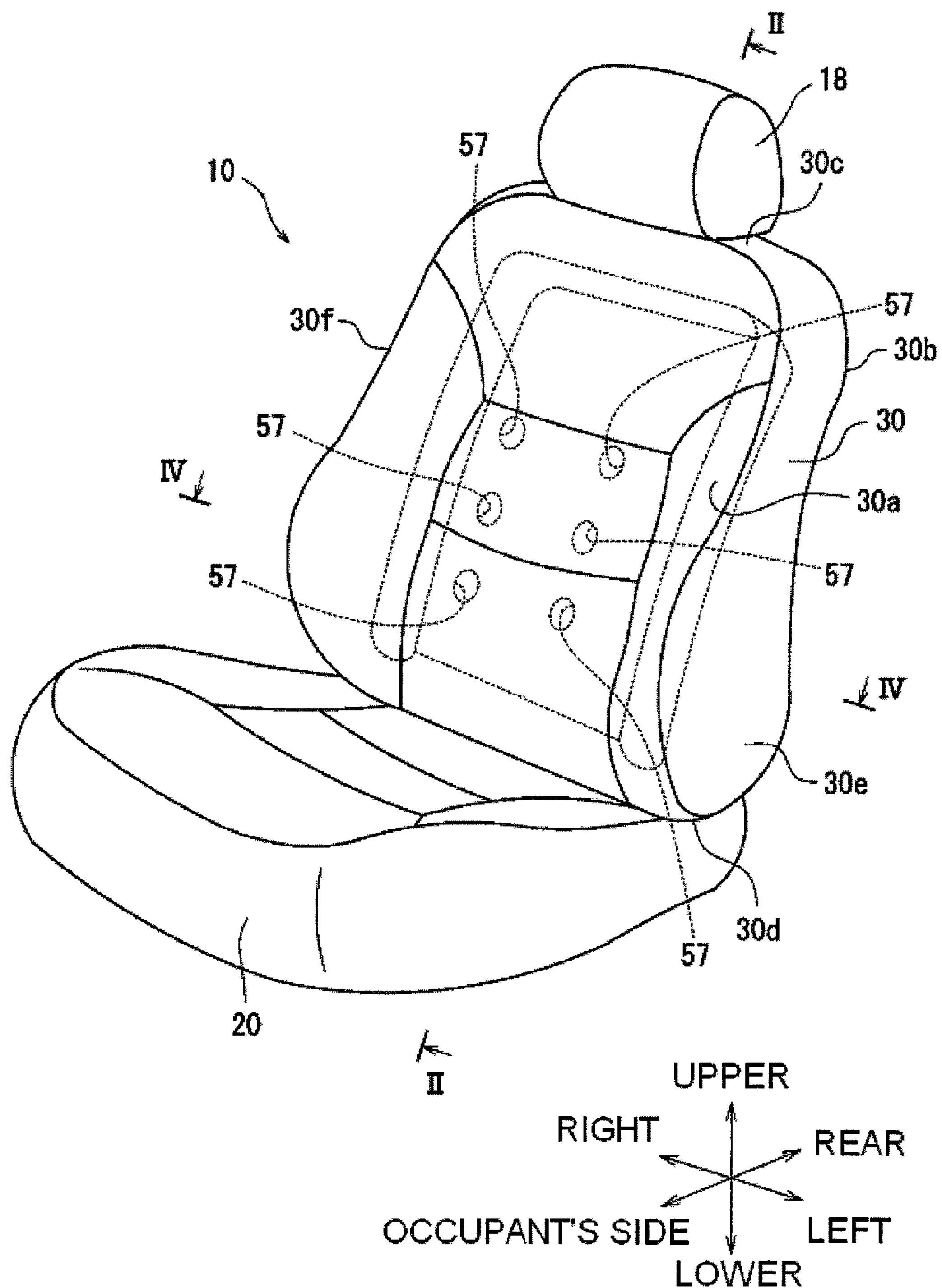
FIG. 1 is a perspective view of a vehicle seat which is provided in a vehicle.
Figure 2:
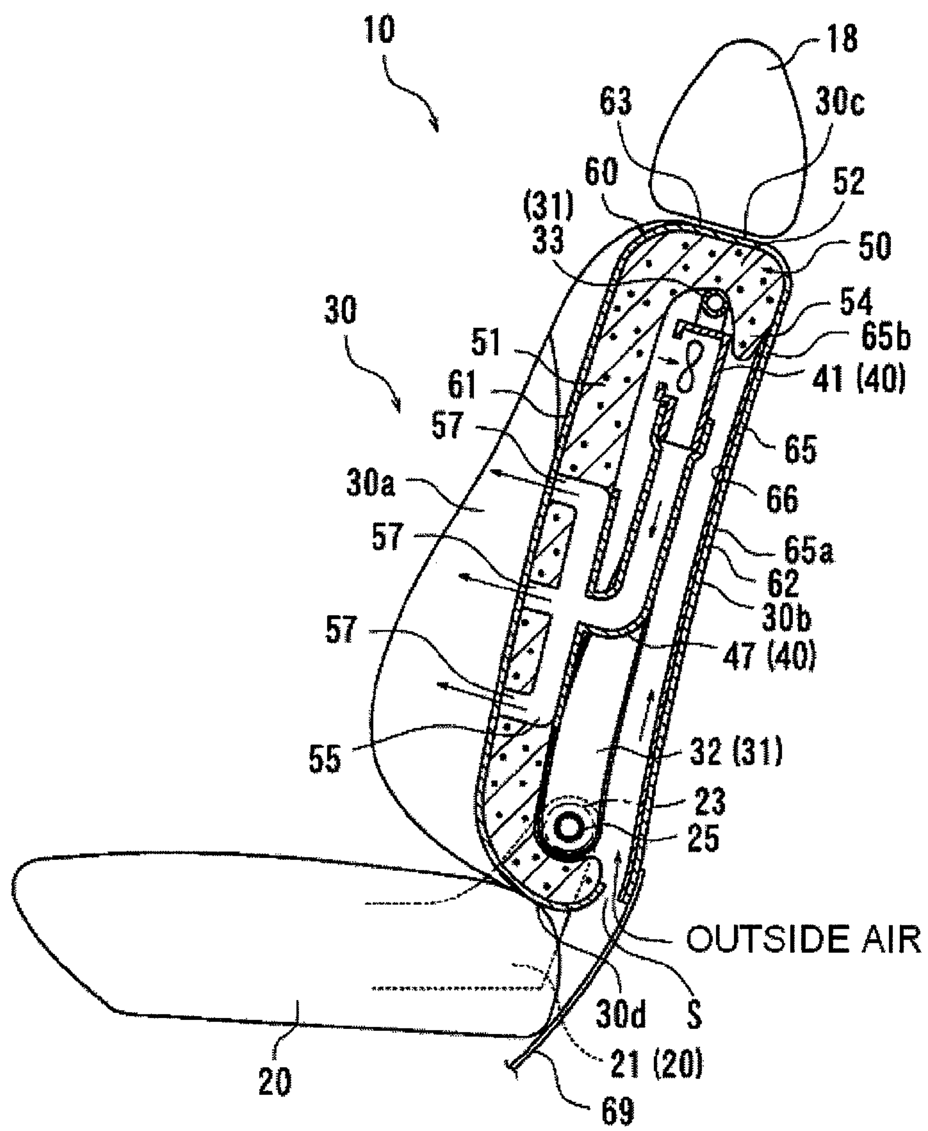
FIG. 2 is a partial sectional view of the vehicle seat taken along the line II-II and seen in a direction indicated by the arrows in FIG. 1.
Figure 3:
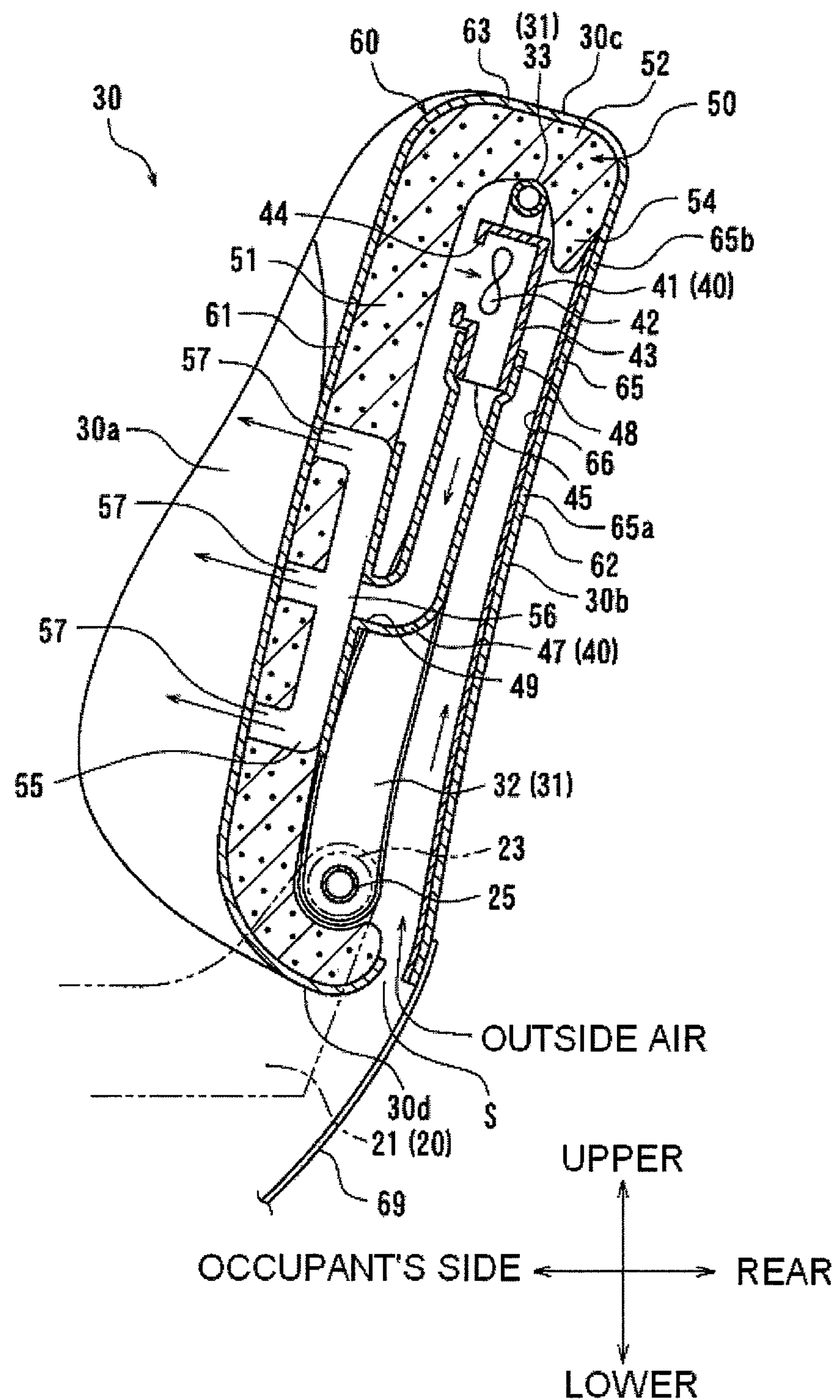
FIG. 3 is an enlarged sectional view showing a seat back shown in FIG. 2.
Figure 4:
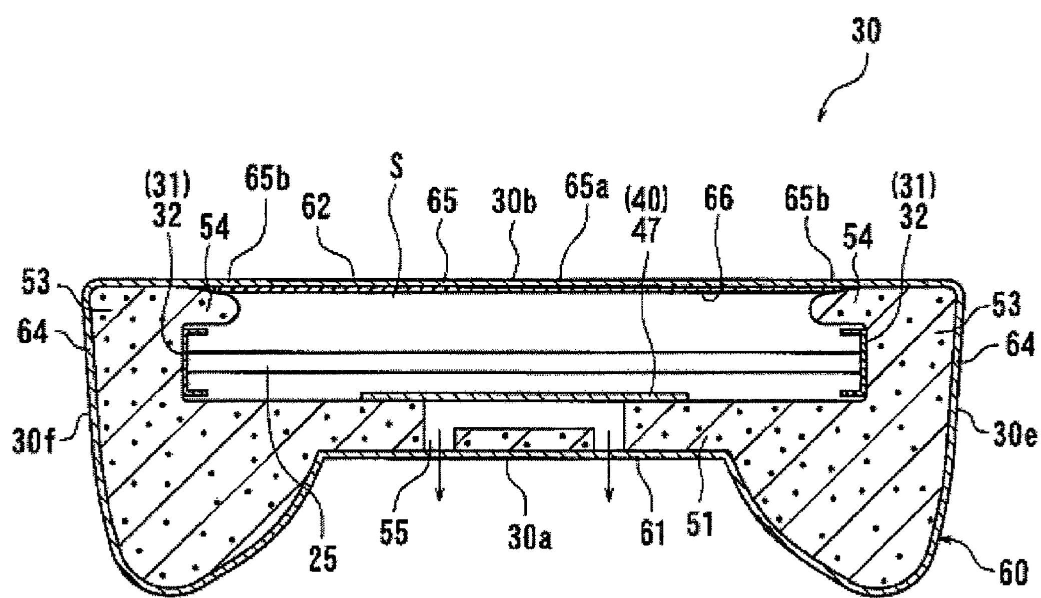
FIG. 4 is a sectional view of the vehicle seat taken along the line IV-IV and seen in a direction indicated by the arrows in FIG. 1.
Figure 4:
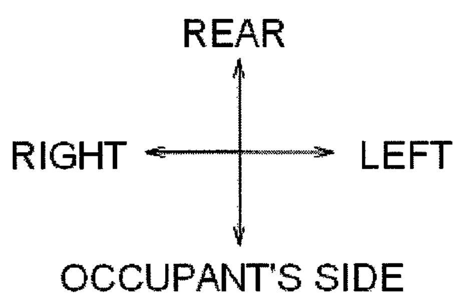

FIG. 1 is a perspective view of a vehicle seat 10 which is provided in a vehicle. FIG. 2 is a partial sectional view of the vehicle seat 10 taken along the line II-II and seen in a direction indicated by the arrows in FIG. 1. FIG. 3 is an enlarged sectional view showing a seat back 30 shown in FIG. 2. FIG. 4 is a sectional view of the vehicle seat 10 taken along the line IV-IV and seen in a direction indicated by the arrows in FIG. 1. It is noted that FIGS. 2 to 4 are simplified for the sake of easy understanding of an interior of the seat back 30. In FIG. 1 and the like, reference numeral 30*a* denotes a seated occupant's side surface of the seat back 30 which is a front surface of the seat back 30 of the vehicle seat 10. Reference numeral 30*b* denotes a rear surface of the seat back 30 which constitutes an opposite surface to the seated occupant's side surface 30*a*. Reference numeral 30*c* denotes an upper surface of the seat back 30 where a headrest 18 is provided. Reference numeral 30*d* denotes a lower surface of the seat back 30 which constitutes an opposite surface to the upper surface 30*c*. In addition, as shown in FIG. 4, reference numerals 30*e*, 30*f* denote left and right lateral surfaces which constitute both widthwise lateral side surfaces of the seat back 30.

As shown in FIG. 1, the vehicle seat 10 is provided in a vehicle such as a motor vehicle. This vehicle seat 10 includes a seat cushion 20, on which an occupant is seated, a seat back 30, against which the back of the occupant rests when the occupant is seated on the seat cushion 20 and a headrest 18, against which the head of the occupant rests when the occupant is seated on the seat cushion 20. Although illustration is omitted in the vehicle seat 10 shown, the headrest 18 is mounted on the seat back 30 via a structure where a headrest stay (not shown) is connected to a seat back frame 31 (described later).

As shown in FIGS. 2 and 3, this vehicle seat 10 includes a blower system 40 therein, which blows air from an interior of the seat back 30 toward the seated occupant on the seat cushion 20. This blower system 40 includes a blower 41 included in the seat back 30. Accordingly, the vehicle seat 10 can ventilate air which is sent from the blower system 40 (the blower 41) toward the seated occupant, as shown in the figures.

As shown in FIGS. 2 and 3, the seat back 30 includes a seat back frame 31 which constitutes a framework of the seat back 30. This seat back frame 31 includes side frames 32 and an upper frame 33 which connects upper end portions of the side frames 32 together. The side frames 32 are connected to a seat cushion frame 21 which constitutes a framework of the seat cushion 20 via a reclining system 23 which is provided therebetween. In addition, reference numeral 25 denotes a connecting rod which is connected to the reclining system 23.

This seat back 30 includes a support member (not shown) which is supported on the seat back frame 31, the blower system 40 and an interior pad 50 which are supported by the support member and a seat cover 60 which configures an exterior covering of the seat back 30.

Next, the blower system 40 will be described. The blower system 40 is mounted on the upper frame 33 via a support member (not shown). Roughly, the blower system 40 includes the blower 41 and a duct portion 47. The blower 41 generates air that is to be blown out toward the seated occupant on the seat cushion 20 from the interior of the seat cushion 30. This blower 41 is configured by a centrifugal blower which is designed to blow out air in a centrifugal direction. This blower 41 includes a blower main body 42 which rotates to generate air and a housing 43 which houses the blower main body 4. Although the blower main body 42 is not described in detail, as with centrifugal blowers which are used widely, the blower main body 42 includes a motor portion which generates rotating drive force and a vane portion which is rotated by the motor portion. The vane portion is designed to rotate to blow out air in the centrifugal direction. The housing 43 houses the blower main body 42 and includes an intake port 44 and a discharge port 45 formed therein. The intake port 44 is provided so as to face the front surface of the seat back 30 to take in air to be blown out by the blower 41, while the discharge port 45 is provided so as to extend toward a lower surface of the seat back 30, so that air that is blown out by the blower 41 is discharged into the duct portion 47 which is connected to the discharge port 45. The duct portion 47 is formed of an elastically deformable resin rubber. This duct portion 47 is connected to the discharge port 45 at an upstream port 48 which lies on an upstream side, and a downstream port 49, which lies on a downstream side, is connected to the interior pad 50 (an air guiding path 55), which will be described below. In this way, the duct portion 47 is configured to blow out air generated by the blower 41 to the air guiding path 55 in the interior pad 50. The upstream port 48 of the duct portion 47 is connected to the discharge port 45 of the housing 43 (the blower 41) by a fitting structure. The downstream port 49 of the duct portion 47 is connected to a connecting port 56 of the air guiding path 55 by a bonding structure.

The interior pad 50 will be described. The interior pad 50 is mounted on the seat back frame 31 (the side frames 32 and the upper frame 33) while being supported on a support member (not shown). The interior pad 50 functions as a cushion material which improves the back supported feeling when the occupant is seated on the seat cushion 20 and uses the seat back 30 as a backrest. In addition, the interior pad 50 has a low permeability which enables the formation of the air guiding path 55, which will be described later. The interior pad 50 is provided so as to face an outer circumference of the seat back 30 other than a part of the rear side of the seat back 30. For example, this interior pad 55 is formed of molded foamed resin material such as formed urethane resin, which has a low permeability and which can deform like a cushion. Specifically, as shown in FIGS. 3 and 4, the interior pad 50 is formed of foamed resin by integral molding so as to extend continuously over a seated occupant's side surface 30*a* side (a seated occupant's side portion 51) of the seat back 30, an upper surface side (an upper portion 52) of the seat back 30 and left and right lateral surface sides (left and right lateral portions 53, 53) of the seat back 30.

Here, in the interior pad 50, a rear surface of the upper portion 52 and the left and right lateral portions 53, 53 faces an outer circumference of the rear surface 30*b* of the seat back 30, as shown FIGS. 3 and 4. Namely, as also shown in FIG. 1, regarding the four surfaces of the seat back 30, that is, the seated occupant's side surface 30*a*, the upper surface 30*c*, and the left and right lateral side surfaces 30*e*, 30*f*, the interior pad 50 (the seated occupant's side portion 51, the upper portion 52, the left and right lateral portions 53, 53) is provided so as to face the outer circumference of the seat back 30. In contrast, regarding the rear surface 30*b* of the seat back 30, the interior pad 50 is not entirely provided so as to face the outer circumference of the seat back 30. Specifically, the upper portion 52 and the left and right lateral portions 53, 53 of the interior pad 50 extend so as to face a part of the outer circumference of the rear surface 30*b* of the seat back 30. In other words, as shown in the figures, a rear surface side end portion 54 of the interior pad 50 (the upper portion 52, the left and right lateral portions 53, 53) extends toward the rear side further than the seat back frame 31 (the side frames 32, the upper frame 33), and this rear surface side end portion 54 faces a part of the outer circumference of the rear surface 30*b* of the seat back 30. This rear surface side end portion 54 constitutes a portion which corresponds to an end portion of the interior pad 50 which lies on the rear surface 30*b* side of the seat back 30. The rear surface side end portion 54 is formed so as to cover the seat back frame 31 (the side frames 32, the upper frame 33) from the rear side as shown in FIGS. 3 and 4.

As shown in FIGS. 3 and 4, the air guiding path 55 is formed in the seated occupant's side portion 51 of the interior pad 50 for guiding air that is blown out from the blower 41 to the seated occupant's side surface 30*a* of the seat back 30. This air guiding path 55 is connected to the downstream port 49 of the duct portion 47 in the above-described manner so as to guide air that is blown out from the blower system 40 to the seated occupant's side surface 30*a* of the seat back 30. Accordingly, as shown in FIG. 3, the connecting port 56, which is opened so as to connect to the downstream port 49 of the duct portion 47, is provided on a rear side (a right side in FIG. 3) of the air guiding path 55. Discharge ports 57 are provided in the seated occupant's side (a left side in FIG. 3) of the air guiding path 55 from which air is blown out through the seat cover 60. As shown in FIG. 1, six discharge ports 57 are formed in the seated occupant's side surface 30*a* in two left and right rows each including three discharge ports arranged in a vertical direction. In this way, the air guiding path 55 has a communicating structure which communicates from the connecting port 56 to the discharge ports 57, 57, . . . as shown in FIG. 3, so that air blown out from the blower 41 can be guided to the seated occupant's side surface 30*a* of the seat back 30. Since the interior pad 50 is formed of the molded foamed resin material having the low permeability, air is not permeated through the interior pad 50 at other portions than the air guiding path 55. It is noted that the air guiding path 55 may be filled with material which has higher permeability than the interior pad 50 instead of forming the air guiding path 55 with space (without filing any material) as in the present illustrative embodiment.

The seat cover 60 covers the interior pad 50 to configure the exterior covering of the seat back 30. The seat cover 60 is formed of fabric and has permeability. As shown in FIGS. 3 and 4, the seat cover 60 has a bag-like configuration in which the upper surface 30*c* (an upper surface 63) and the left and right lateral surfaces 30*e*, 30*f* (left and right lateral surfaces 64, 64) of the seat back 30 are connected together so that a seated occupant's side surface portion 61 which lies on the rear surface 30*b* side of the seat back 30 when the seat cover 60 is placed on accordingly and a rear surface portion 62 which lies on the seated occupant's side surface 30*a* side of the seat back 30 when the seat cover 60 is placed on accordingly are joined together. Although illustration is omitted, the seat cover 60 has an opening at a position where a headrest stay for mounting the headrest 18 is attached to the seat back frame 31. Namely, the seat cover 60 is formed of fabric having permeability into the bag-like configuration which allows the discharge of air from the discharge ports 57, 57, . . . formed in the interior pad 50 to the outside of the seat back 30. The seat cover 60 which has the integrated bag-like configuration as described above is placed to cover the seat back 30 from the upper surface 30*c* side toward the lower surface 30*d* side to eventually be configured as the exterior covering of the seat back 30. Once the seat cover 60 is placed as described above, a slight gap (air intake part; denoted by reference character S in the figures) is formed on the lower surface 30*d* side of the seat back 30 by the bag-like configuration to allow a permeation or intake of outside air into the seat back 30.

Incidentally, at least a part of the rear surface portion 62 of the seat cover 60, which does not cover the interior pad 50 is configured as a permeation block portion 65. Namely, in the rear surface portion 62 of the seat cover 60, the portion which does not cover the interior pad 50 is defined as a non-covering portion 65*a*, a portion which partially overlaps the rear surface side end portion 54 of the interior pad 50 is defined as a lapping portion 65*b*. Then, a portion made up by joining the non-covering portion 65*a* and the lapping portion 65*b* together is defined as the permeation block portion 65. In other words, if the portion which does not cover the interior pad 50 is extended in a circumferential direction until it partially overlaps the rear surface side end portion 54 of the interior pad 50, the portion is eventually extended to a size by which the portion is defined as the permeation block portion 65.

The permeation block portion 65 has permeability lower than that of the seated occupant's side surface portion 61. Specifically, as shown in FIGS. 3 and 4, the permeation block portion 65 is formed by attaching non-permeable film 66 in a range described above, to an inside of the seat cover 60 which is not exposed to the outside. In this way, the permeability of the permeation block portion 65 where the non-permeable film 66 is attached to the inside of the seat cover 60 is set to be lower than the permeability of the seated occupant's side surface portion 61 of the seat cover 60 due to the non-permeability of the non-permeable film 66. Therefore, the permeation block portion 65 of the seat cover 60 functions to block the permeation of air from the outside of the seat back 30 to the interior of the seat back 30. The non-permeable film 66 may have permeability as long as the permeability is lower than the seated occupant's side surface portion 61.

Since the seat cover 60 has the bag-like configuration described above, when the seat cover 60 is place on the interior pad 50, the slight gap (denoted by reference character S in the figures) is naturally formed on the lower surface 30*d* side of the seat back 30 where permeation or intake of outside air into the seat back 30 is enabled.

Further, a lower belt 69 is provided below the slight gap S to apply tension to the rear surface portion of the seat cover 60.

According to the above-described vehicle seat 10, the following effects and advantage can be achieved.

According to the vehicle seat 10, air that is blown out from the blower 41 is guided to the seated occupant's side surface 30*a* of the seat back 30 via the air guiding path 55 which is formed in the interior pad 50. Here, the air is sent from the interior of the seat back 30 to the outside of the seat back 30 due to the permeability of the fabric seat cover 60, so that air is blown toward the seated occupant, so that the seated occupant can feel coolness.

In addition, at least the part of the rear surface portion 62 of the seat cover 60 having the bag-like configuration is configured as the permeation block portion 65 where the permeation of air from the outside of the seat back 30 to the interior of the seat back 30 is blocked. Thus, permeation of air from the outside of the seat back 30 to the interior of the seat back 30 is blocked by the interior pad 50 having the low permeability and the permeation block portion 65. Therefore, for taking outside air of the seat back 30 into the interior of the seat back 30 where the blower 41 is provided, air is not taken in through the seat cover 60, so that the seat cover 60 can be prevented from functioning as an air filter. In other words, an air guiding path is defined between the interior pad 50 and the permeation block portion 65 of the rear surface portion 62 of the seat cover 60, and outside air is guided to the blower 41 though the air guiding path. Consequently, the possibility of the fabric seat cover getting dirty can be reduced, thereby making it possible to maintain the good external appearance of the vehicle seat 10 without being deteriorated.

It is noted that for taking in outside air of the seat back 30 into the interior of the seat back 30 where the blower 41 is provided, air is taken in from the slight gap S which is naturally formed on the lower surface 30*d* side of the seat back 30. This slight gap S is formed on the lower surface 30*d* side of the seat back 30 which affects the external appearance of the vehicle seat 10 not so much. Therefore, even if the periphery of the slight gap S would get dirty by the intake air, the external appearance of the vehicle seat 10 is affected badly.

According to the vehicle seat 10, the permeation block portion 65 of the seat cover 60 extends until it partially overlaps the rear surface side end portion 54 which constitutes the end portion of the interior pad 50 which lies on the rear side of the seat back 30. Thus, air cannot be taken in from a boundary portion between the interior pad 50 and the permeation block portion 65 of the seat cover 60 to the interior of the seat back 30. Therefore, the possibility of the boundary portion between the interior pad 50 and the permeation block portion 65 of the seat cover 60 getting dirty can be reduced, thereby making it possible to maintain the good external appearance of the vehicle seat without being deteriorated.

While the present invention has been shown and described with reference to certain exemplary embodiments thereof, it will be understood by those skilled in the art that various changes in form and details may be made therein without departing from the spirit and scope of the invention as defined by the appended claims.

For example, the permeation block portion 65 of the vehicle seat 10 according to the above-described illustrative embodiment is formed by attaching the non-permeable film 66 having no or lower permeability to the inside of the seat cover 60. However, the permeation block portion may only have to be formed so that its permeability is set to be lower than that of the seated occupant's side surface portion 61 of the seat cover 60 so as to block the permeation of air from the outside of the seat back 30 to the interior of the seat back 30. Thus, the present invention is not limited to the configuration in which the permeation block portion is formed by attaching the non-permeable film 66 to the inside of the seat cover 60.

Specifically, the permeation block portion may be formed by attaching a piece of soft felt, which is different from the non-permeable film 66 described above, to the inside of the seat cover 60. In addition to attaching the non-permeable film or the piece of felt to the inside of the seat cover 60, the permeation block portion may be formed by applying an appropriate backing treatment. Additionally, the permeation block portion may be formed by configuring the rear surface portion 62 of the seat cover 60 by different material having different permeability.

The permeability of the seated occupant's side surface portion 61 of the seat cover 60 is generally so as to have "100 $cc/cm^2/sec$ or larger." The permeability of the permeation block portion which should be lower than the general permeability above is preferably set to "10 $cc/cm^2/sec$ or lower."

In addition, in the above-described illustrative embodiment, the range where the permeation block portion 65 is defined is the range resulting from combining the non-covering portion 65*a* which does not cover the interior pad 50 and the lapping portion 65*b* which partially overlaps the rear surface side end portion 54 of the interior pad 50. However, the range where the permeation block portion is defined may be configured only by the range of the non-covering portion 65*a* which does not cover the interior pad 50.

In the vehicle seat 10 according to the above-described embodiment, for taking outside air of the seat back 30 toward the interior of the seat back 30 where the blower 41 is provided, air is designed to be taken in from the slight gap S which is naturally formed on the lower surface 30*d* side of the seat back 30. However, the present invention is not limited thereto. An appropriate configuration can be adopted where outside air can be taken in toward the interior of the seat back. For example, a configuration may be adopted where a duct which communicates with the gap S is provided, and an inlet port of the duct is provided under the seat cushion 20 so as to taken in outside air. In addition, although the external appearance of the vehicle seat needs to be taken into consideration, a configuration may be adopted where a part of the seat cover 60 which lies on the seated occupant's side is formed into a net-like portion so that outside air is taken in from the net-like portion.

What is claimed is:

1. A vehicle seat comprising:

a seat cushion, on which an occupant is seated;

a seat back which configures a backrest, against which a back of the occupant rests, and which includes a blower provided therein and configured to blow outside air toward the occupant seated on the seat cushion, wherein the seat back includes:

an interior pad which is provided so as to face an outer circumference of the seat back other than a part of the seat back at a rear side opposite to a seated occupant's side; and a fabric seat cover which has permeability and covers the interior pad to configure an exterior covering, wherein the seat cover includes:

a seated occupant's side surface portion which lies on the seated occupant's side of the seat back when the seat cover is placed on; and a rear surface portion which lies on the rear side of the seat back when the seat cover is placed on, the seated occupant's side surface portion and the rear surface portion being joined together to form a bag-like configuration, and a lower belt which applies tension to the rear surface portion of the seat cover, wherein the interior pad is formed with an air guiding path which is configured to guide air sent from the blower to a surface of the seat back at the seated occupant's side, and wherein at least a part of the rear surface portion of the seat cover, which does not cover the interior pad, is formed as a permeation block portion having permeability lower than that of the seated occupant's side surface portion of the seat cover so as to block the permeation of air into an interior of the seat back from the outside of the seat back.

2. The vehicle seat according to claim 1, wherein the interior pad is provided to extend continuously over the seated occupant's side of the seat back, an upper side of the seat back and left and right lateral side of the seat back, and wherein the permeation block portion extends so as to partially overlap an end portion of a part of the interior pad at the rear side of the seat back.

3. The vehicle seat according to claim 1, wherein the permeation block portion is formed by attaching a member which has permeability lower than that of the seated occupant's side surface portion of the seat cover, to the at least the part of the rear surface portion of the seat cover.

4. The vehicle seat according to claim 3, wherein the member includes a non-permeable film.

5. A vehicle seat comprising:

a seat cushion;

a seat back which includes:

a fabric seat cover having a front portion and a rear portion; and an interior pad which supports the front portion of the seat cover and parts of the rear portion of the seat cover at right and left sides of the seat back, to configure an outer shape of the seat back, and which includes a first air guiding path, a blower which is provided in the seat back between the interior pad and the rear portion of the seat cover and which is configured to blow air toward the front portion of the seat cover through the first air guiding path;

an air intake part which is formed between the front portion and the rear portion of the seat cover at a lower end thereof; and a second air guiding path which is defined between the interior pad and the rear portion of the seat cover, and which is configured to guide air from the air intake part to the blower wherein the rear portion of the seat cover is attached with a member which has permeability lower than that of the seat cover, and wherein the member extends to overlap parts of the interior pad, at which the interior pad supports the parts of the rear portion of the seat cover.

6. A vehicle seat comprising:

a seat cushion, on which an occupant is seated; and a seat back which configures a backrest, against which a back of the occupant rests, and which includes a blower provided therein and configured to blow outside air toward the occupant seated on the seat cushion, wherein the seat back includes:

an interior pad which is provided so as to face an outer circumference of the seat back other than a part of the seat back at a rear side opposite to a seated occupant's side; and a fabric seat cover which has permeability and covers the interior pad to configure an exterior covering, wherein the seat cover includes:

a seated occupant's side surface portion which lies on the seated occupant's side of the seat back when the seat cover is placed on; and a rear surface portion which lies on the rear side of the seat back when the seat cover is placed on, the seated occupant's side surface portion and the rear surface portion being joined together to form a bag-like configuration, wherein the interior pad is formed with an air guiding path which is configured to guide air sent from the blower to a surface of the seat back at the seated occupant's side, wherein at least a part of the rear surface portion of the seat cover, which does not cover the interior pad, is formed as a permeation block portion having permeability lower than that of the seated occupant's side surface portion of the seat cover so as to block the permeation of air into an interior of the seat back from the outside of the seat back, wherein the interior pad is provided to extend continuously over the seated occupant's side of the seat back, an upper side of the seat back and left and right lateral side of the seat back, and wherein the permeation block portion extends so as to partially overlap an end portion of a part of the interior pad at the rear side of the seat back.

* * * * *